C. S. DAY.
Hominy Mill.
No. 232,693.  Patented Sept. 28, 1880.
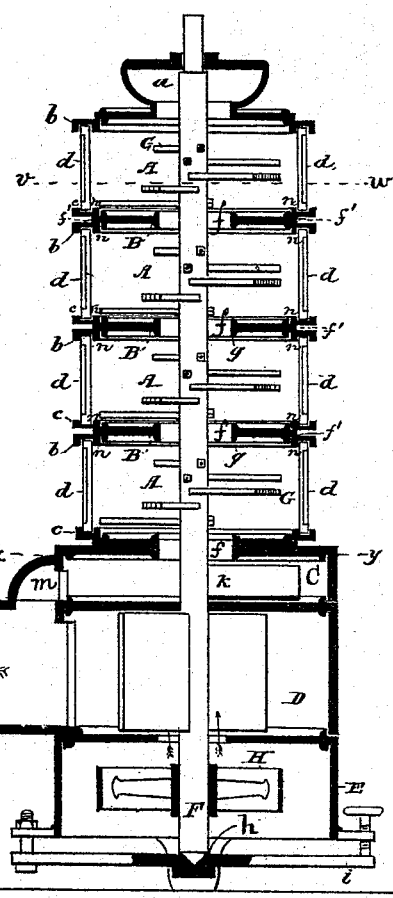
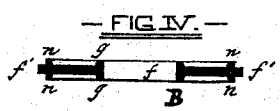
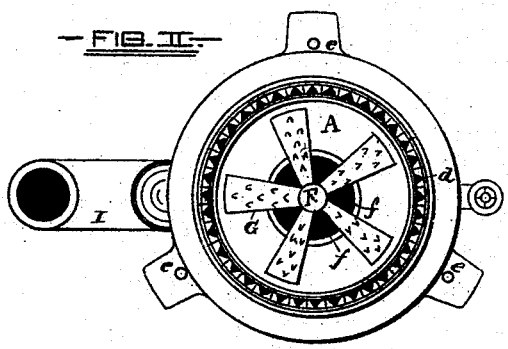
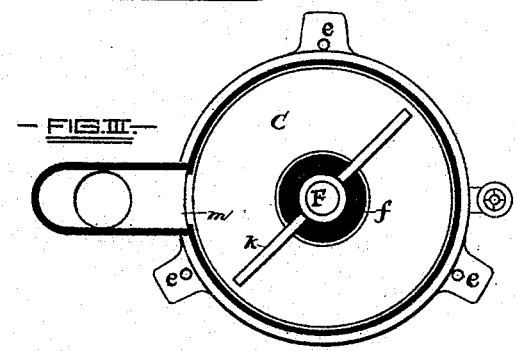
WITNESSES
Geo. A. Boyden
Harry V. Albaugh
INVENTOR
Charles S. Day
by G. H. W. J. Howard
atty

UNITED STATES PATENT OFFICE.

CHARLES S. DAY, OF BALTIMORE, MARYLAND.

HOMINY-MILL.

SPECIFICATION forming part of Letters Patent No. 232,693, dated September 28, 1880.

Application filed January 13, 1880.

*To all whom it may concern:*

Be it known that I, CHARLES S. DAY, of the city of Baltimore and the State of Maryland, have invented certain Improvements in Hominy-Mills, of which the following is a specification; and I do hereby declare that in the same is contained a full, clear, and exact description of my said invention, reference being had to the accompanying drawings, and to the letters of reference marked thereon.

My invention relates to improvements in hominy-mills; and it consists in certain details of construction hereinafter more fully set forth.

In the further description of my said invention which follows reference is made to the accompanying drawings, in which—

Figure 1 is a vertical section of my improved hominy-mill. Figs. 2 and 3 are sectional plans of the mill on the dotted lines $v\ w$ and $x\ y$, respectively. Fig. 4 is a detached sectional view of one of the plates separating the cages, which plates are all constructed alike.

Similar letters of reference indicate similar parts in all the views, and arrows designate the direction of air-currents.

A A are the cages, which are here shown as four in number, in which the grinding or breaking process which reduces the corn to hominy is accomplished. The said cages are situated one upon the other, and the uppermost one is closed at the top with a plate, and has a hopper, $a$, into which the corn to be reduced to hominy is fed. Each cage consists of an upper and a lower ring, respectively represented by $b$ and $c$, connected by removable staves or bars $d$, and the several parts of the cage are held together by means of bolts $e$. The staves or bars $d$ are of a triangular cross-section, and they are arranged to stand slightly apart to allow of the escape of a portion of what is termed the "chop" in the revolution of the beaters, hereinafter more particularly described. The cages are separated by plates B, having central openings, $f$, for the passage of the corn from one cage to the one next below it, and each opening $f$ is surrounded by a flange, $g$, for purposes hereinafter described.

$n\ n$ (see Fig. 1) represent flanges near the outer edges of the plates B, which project, one upwardly and the other downwardly, from the top and bottom faces of the plate B, and serve to guide the rings of the cages into position one upon the other and retain them in place.

It will be perceived that each cage can be separately detached, and that each plate can also readily be detached and their places supplied by other cages and plates.

The lowest cage rests upon a plate, B, which, in turn, rests upon the upper head of the sweep-chamber C. The lower head of the sweep-chamber divides that compartment from the fan-chamber D, which has a lower head resting upon a ring, E, supported by legs. The whole structure is secured together by means of bolts, substantially as shown.

F is the driving-shaft, extending from a stop, $h$, on the adjustable lever or bar $i$ to a bearing at the upper part of the hopper $a$. G G are the beaters, consisting of bars roughened after the manner of a rasp, projecting from the driving-shaft F, and they are arranged one above the other in such manner as to form a skeleton spiral.

All the cages are furnished alike with a series of beaters, which, in the operation of the mill, revolve with the driving-shaft at a high rate of speed. Motion is communicated to the shaft F by means of the driving-pulley H. The part of the shaft F inclosed within the sweep-chamber C is fitted with a sweep, $k$, and that part of the said shaft passing through the fan-chamber with a fan, $l$, which, with the sweep, are of the ordinary description.

Parts of the invention not yet alluded to will be fully described and their uses set forth in the description of the operation of reducing corn to hominy by means of my improved mill, which follows: The driving-shaft being put in revolution, the corn is fed through the hopper $a$ to the upper cage, and in passing to the next cage below is partially reduced to hominy by contact with the rapidly-revolving beaters. At the beginning of the operation the reducing process is only partially accomplished; but when all the cages become filled or fully charged the process is carried on with regularity. A large portion of the chop and dust is forced through the interstices between the bars of the cages.

The size of the hominy is, to a great extent, regulated by the height of the lower beaters above the plates B, and this adjustment of the beaters with reference to the said plates is effected by means of the adjustable lever *i*.

It will be understood that the flanges *g* prevent the beaters being lowered to too near the surface of the plates, and consequently the grinding of the hominy to meal.

As the hominy and a large quantity of small particles of corn and refuse matter pass from the lowest cage to the sweep-chamber C they are caught by the sweep *k* and forced through a port, *m*, in the side of the said chamber to an extension, I, of the fan-chamber, through which a blast of air from the fan passes. In the passage of the hominy through the extension of the fan-chambers the small particles of corn and refuse matter are driven by the air-blast through the upper aperture, the hominy falling in a cleansed condition through the lower opening, *o*, in the said extension.

In placing the beaters spirally on the driving-shaft an enforced feed is accomplished, and the progress of the corn through the cages is therefore very rapid, and the production of the mill greatly increased, and the formation of the cylindrical portion of the cages of removable bars allows broken bars or staves being replaced with new ones, which cannot be accomplished when the cages are cast in one piece.

It is well known that the cages of mills of this description are constantly being broken in consequence of the internal pressure of the corn during the hominy-making process, and the replacing of a broken cage with an entire new one is a source of great expense.

The construction of the mill as described, which allows of the air being taken from below instead of through a hollow driving-shaft, admits of the driving-shaft being made of much smaller diameter, thus at the same time increasing the size of the cages and the length of the beaters without adding to the exterior diameter of the mill.

I claim as my invention—

In a hominy-mill, a series of cages, each consisting of an upper and lower ring, *b c*, with detachable staves between them, and connected together by bolts *e*, each forming a separate detachable cage, in combination with the detachable plates B, each provided with a central opening, a peripheral flange, *f'*, and guide-flanges *n n*, projecting, one upwardly and the other downwardly, from the opposite faces of the plate and fitting into the circular openings of two adjacent rings, substantially as described, and for the purpose set forth.

C. S. DAY.

Witnesses:
HARRY V. ALBAUGH,
JNO. T. MADDOX.